(12) United States Patent
Jiang

(10) Patent No.: US 6,829,358 B2
(45) Date of Patent: Dec. 7, 2004

(54) PROCESSING CHANNEL RESETS WHILE PERFORMING A CIPHERING CONFIGURATION CHANGE IN A WIRELESS COMMUNICATIONS PROTOCOL

(75) Inventor: Sam Shiaw-Shiang Jiang, Hsin-Chu (TW)

(73) Assignee: ASUSTeK Computer Inc., Taipei (TW)

( * ) Notice: Subject to any disclaimer, the term of this patent is extended or adjusted under 35 U.S.C. 154(b) by 646 days.

(21) Appl. No.: 09/682,317

(22) Filed: Aug. 20, 2001

(65) Prior Publication Data

US 2003/0035545 A1 Feb. 20, 2003

(51) Int. Cl.[7] .................................................. H04K 1/00
(52) U.S. Cl. ...................... 380/272; 380/270; 380/273; 370/324; 455/410; 455/411
(58) Field of Search ................................ 380/272, 273, 380/270; 370/324; 455/410, 411

(56) References Cited

U.S. PATENT DOCUMENTS

| | | | | |
|---|---|---|---|---|
| 5,081,679 A | * | 1/1992 | Dent | 380/272 |
| 5,471,523 A | * | 11/1995 | Smith et al. | 379/165 |
| 2002/0025820 A1 | * | 2/2002 | Fauconnier et al. | 455/452 |
| 2002/0066011 A1 | * | 5/2002 | Vialen et al. | 713/150 |
| 2002/0191556 A1 | * | 12/2002 | Krishnarajah et al. | 370/329 |
| 2004/0039910 A1 | * | 2/2004 | Isokangas et al. | 713/171 |

OTHER PUBLICATIONS

3GPP TS 25.331 V3.7.0 (Jun. 2001) (8.1.12.2.1/8.1.12.3/8.6.3.4).

* cited by examiner

Primary Examiner—Ayaz Sheikh
Assistant Examiner—Michael Vaughan
(74) Attorney, Agent, or Firm—Winston Hsu

(57) ABSTRACT

A first station communicates with a second over first and second channels. The first station includes first and second ciphering configurations, and a ciphering engine. The ciphering engine uses the first or second ciphering configuration when ciphering data. Activation times are determined for the channels. A ciphering reconfiguration message is composed containing the activation times. The first station transmits the ciphering reconfiguration message to the second station along the second channel. A reset operation is performed on one of the channels, which does not affect the corresponding activation time. The ciphering engine uses the first ciphering configuration prior to the activation times, and uses the second ciphering configuration on or after the activation times.

18 Claims, 7 Drawing Sheets

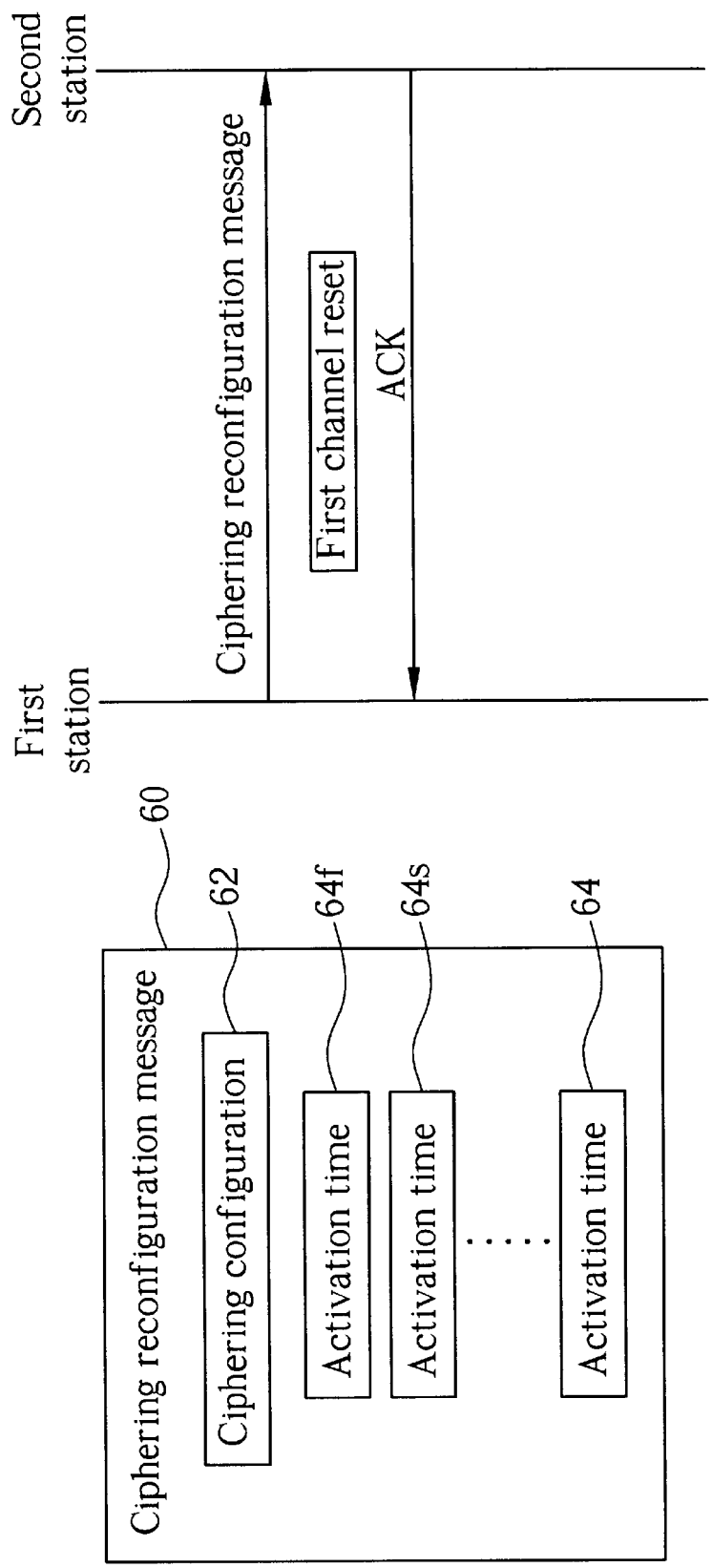

PROCESSING CHANNEL RESETS WHILE PERFORMING A CIPHERING CONFIGURATION CHANGE IN A WIRELESS COMMUNICATIONS PROTOCOL

BACKGROUND OF INVENTION

1. Field of the Invention

The present invention relates to a wireless communications protocol. In particular, the present invention discloses the handling of a channel reset condition while processing a ciphering configuration change in a wireless communications protocol.

2. Description of the Prior Art

Please refer to FIG. 1. FIG. 1 is a simplified block diagram of a prior art wireless communications system. The wireless communications system includes a first station 10 in wireless communications with a second station 20. As an example, the first station 10 may be a base station, while the second station 20 is a mobile unit, such as a cellular telephone. The first station 10 communicates with the second station 20 over a plurality of channels 12. The second station 20 thus has corresponding channels 22, one for each of the channels 12. Each channel 12 has a receiving buffer 12r for holding protocol data units (PDUs) 11r received from the corresponding channel 22 of the second station 20. Each channel 12 also has a transmitting buffer 12t for holding PDUs 11t that are awaiting transmission to the corresponding channel 22 of the second station 20. A PDU 11t is transmitted by the first station 10 along a channel 12 and received by the second station 20 to generate a corresponding PDU 21r in the receiving buffer 22r of the corresponding channel 22. Similarly, a PDU 21t is transmitted by the second station 20 along a channel 22 and received by the first station 10 to generate a corresponding PDU 11r in the receiving buffer 12r of the corresponding channel 12.

For the sake of consistency, the data structures of pair entity (PDUs) 11t, 21r, and 21t, 11r along corresponding channels 12 and 22 are identical. That is, a transmitted (PDUs) 11t generates an identical corresponding received PDU 21r, and a transmitted PDU 21t generates an identical corresponding PDU 11r. Although the data structure of each pair entity PDU 11t, 21r, and 21t, 11r along corresponding channels 12 and 22 is identical, different channels 12, 22 may use different PDU data structures according to the type of connection agreed upon along the channels 12, 22. In general, though, every PDU 11r, 11t, 21r and 21t will have a sequence number 5r, 5t, 6r, 6t. The sequence number 5r, 5t, 6r, 6t is an m-bit number that is incremented for each PDU 11r, 11t, 21r, 21t. The magnitude of the sequence number 5r, 5t, 6r, 6t indicates the sequential ordering of the PDU 11r, 11t, 21r, 21t in its buffer 12r, 12t, 22r, 22t. For example, a received PDU 11r with a sequence number 5r of 108 is sequentially before a received PDU 11r with a sequence number 5r of 109, and sequentially after a PDU 11r with a sequence number 5r of 107. The sequence number 5t, 6t is often explicitly carried by the PDU 11t, 21t, but may also be implicitly assigned by the station 10, 20. For example, in an acknowledged mode setup for corresponding channels 12 and 22, each transmitted PDU 11t, successful reception of which generates an identical corresponding PDU 21r, is acknowledged as received by the second station 20. A 12-bit sequence number 5t is explicitly carried by each PDU 11t in acknowledged mode transmissions. The second station 20 scans the sequence numbers 6r embedded within the received PDUs 21r to determine the sequential ordering of the PDUs 21r, and to determine if any PDUs 21r are missing. The second station 20 can then send a message to the first station 10 that indicates which PDUs 21r were received by using the sequence numbers 6r of each received PDU 21r, or may request that a PDU 11t be re-transmitted by specifying the sequence number 5t of the PDU 11t to be re-transmitted. Alternatively, in an unacknowledged transmission mode, 7-bit sequence numbers 5t, 6t are explicitly carried by the transmitted (PDUs) 11t, 21t, but received PDUs 11r, 21r are not acknowledged as successfully received. In certain special cases, such as a transparent transmission mode, sequence numbers are not even assigned to (PDUs) 11t, 11r, 21t, 21r. This transparent transmission mode, however, is not of direct relevance to the present invention. The present invention concerns itself with only acknowledged and unacknowledged transmission modes, both of which use explicitly embedded sequence numbers 5t, 6t in the transmitted PDUs 11t, 21t.

The PDUs 11t and 21t are generally not transmitted "out in the open". A ciphering engine 14 on the first station 10, and a corresponding ciphering engine 24 on the second station 20, together ensure secure and private exchanges of data exclusively between the first station 10 and the second station 20. A primary function of the ciphering engine 14, 24 is the obfuscation (i.e., ciphering, or encryption) of data held within a transmitted PDU 11t, 21t so that the corresponding PDU 11r, 21r presents a meaningless collection of random numbers to an eavesdropper. For transmitting a PDU 11t, the ciphering engine 14 uses, amongst other inputs, a ciphering key 14k to perform ciphering functions upon a PDU 11t. To properly decipher a corresponding PDU 21r, the corresponding ciphering engine 24 must use an identical ciphering key 24k. The ciphering keys 14k, 24k remain constant across all PDUs 11t, 21t (and thus corresponding PDUs 21r, 11r) and channels 12, 22, until explicitly changed by both the first station 10 and the second station 20. Changing of the ciphering keys 14k, 24k is effected by a security mode reconfiguration process that involves handshaking between the first station 10 and the second station 20 to ensure proper synchronization of the ciphering engines 14, 24. The base station, i.e., the first station 10, typically initiates the security mode reconfiguration process. Security mode reconfiguration is used to both activate and deactivate ciphering of transmitted PDUs 11t, 21t, and to change the ciphering key 14k, 24k.

It is noted that, for the sake of security, the ciphering keys 14k and 24k should be changed after a predetermined security interval 14x. The security interval 14x may depend upon an actual elapsed time-of-use of the ciphering key 14k, 24k, or upon a usage count of the ciphering key 14k, 24k. Regardless, periodic changing of the ciphering key 14k, 24k makes unauthorized deciphering of received PDUs 11r, 21r more difficult. When an established channel 12, 22 exceeds the security interval 14x, the first station 10 (i.e., the base station) may initiate a security mode reconfiguration process to change the ciphering keys 14k and 24k to new ciphering keys 14n and 24n. Both of the ciphering keys 14n and 24n are identical, and should not be the same as the previous ciphering keys 14k and 24k. Changing over to the new ciphering keys 14n, 24n must be carefully synchronized across all channels 12, 22 to ensure that transmitted (PDUs) 11t, 21t are properly deciphered into received PDUs 21r, 11r. For example, if a (PDUs) 11t is enciphered using the ciphering key 14k, and the ciphering engine 24 attempts to decipher the corresponding received PDU 21r using the new ciphering key 24n, the received PDU 21r will be deciphered into meaningless data due to the lack of synchronization of the ciphering keys 14k and 24n as applied to the PDUs 11t and 21r.

Security mode reconfiguration is a somewhat complicated process that involves several steps. One of the initial steps is the transmitting by the first station 10 of a ciphering reconfiguration message, a so-called security mode command, along a special signaling channel 12s to the second station 20. The security mode command indicates the new ciphering configuration that is to be used by the stations 10 and 20, such as the use of the new ciphering key 14n, 24n, or the activation/deactivation of PDU 11t, 21t ciphering. Note that the security mode command is itself necessarily carried by one or more PDUs 11t, and thus may be enciphered under the old ciphering configuration, i.e., using the ciphering key 14k. The channel 12s is an acknowledged mode channel, and thus the second station 20 will explicitly acknowledge the successful reception of each PDU 11t that carries the security mode command. In this manner, the first station 10 can be certain that the security mode command was received, and hence processed, by the second station 20.

Before the transmitting of the security mode command by the first station 10, only the ciphering key 14k, 24k is used for all channels 12, 22. Similarly, after the security mode reconfiguration process has been fully completed, only the new ciphering key 14n, 24n is used for all channels 12, 22 (if, that is, the security mode command indicated that the new ciphering key 14n, 24n was to be used). However, during execution of the security mode reconfiguration process, and the resulting hand shaking between the two stations 10 and 20, there could be confusion as to which ciphering key 14k, 24k, or 14n, 24n should be used. To prevent this from happening, the security mode command provides for a so-called activation time 17t, 27r for each channel 12, 22. The activation time 17t, 27r is simply a sequence number value 5t, 6r of PDUs 11t, 21r. To generate the security mode command, the first station 10 determines an activation time 17t for the transmitting buffer 12t of each channel 12. The activation times 17t are not necessarily the same across all channels 12, and, in fact, will generally be different. The security mode command sent by the first station 10 to the second station 20 provides not only the ciphering configuration to be used (i.e., the new key 14n, 24n), but also the activation times 27t, which the second station 20 then uses to generate an identical corresponding activation time 27r for the corresponding receiving buffer 22r of each channel 22. In response to the security mode command, the second station 20 determines an activation time 27t for the transmitting buffer 22t of each channel 22. The second station 20 then sends a ciphering reconfiguration message, a so-called security mode complete message, to the first station 10, which contains the activation times 27t. The security mode complete command is also sent along the corresponding signaling channel 22s, and each PDU 21t of the security mode complete command is thus explicitly confirmed by the first station 10 as successfully received. In this manner, the second station 20 may know that the security mode complete command was received by the first station 10. The first station 10 uses the security mode complete message to provide an activation time 17r to the receiving buffer 12r of each channel 12, which is identical to the activation time 27t of the corresponding channel 22 on the first station 20. The activation times 17r, 17t and 27r, 27t ensure proper synchronization between the security engines 14 and 24. Using the first station 10 as an example, for all PDUs 11t that have sequence numbers 5t that are prior to the activation time 17t for their channel 12, the PDUs 11t are enciphered using the old ciphering key 14k. For PDUs 11t which have sequence numbers 5t that are sequentially on or after the activation time 17t, the new ciphering key 14n is applied for enciphering. When receiving the PDUs 11t, the second station 20 uses the sequence numbers 6r and the activation time 27r to determine which key 24k or 24n to use for the deciphering of the PDUs 21r. A similar transmitting process also occurs on the second station 20, with each channel 22 having the activation time 27t, and each corresponding receiving buffer 12r on the first station 10 having an identical activation time 17r. The security mode reconfiguration process thus provides for synchronization of the activation times 17r with 27t, and 17t with 27r, so that the second station 20 and first station 10 may know how to apply their respective ciphering keys 24n, 24k and 14n, 14k to received PDUs 21r, 11r and transmitted PDUs 11t, 21t.

Determination of the activation times 17t, 27t is relatively straightforward. Each transmitting buffer 12t, 22t has a state variable VT(S) 12v, 22v. Each state variable VT(S) 12v, 22v holds the sequence number 5t, 6t of a PDU 11t, 21t that is next to be transmitted along the respective channel 12, 22 of the transmitting buffer 12t, 22t. The first station 10 initially decides how much time, in terms of transmitted PDUs 11t, is required to complete the security mode reconfiguration process, a parameter N. For each channel 12, including the signaling channel 12s, the first station 10 then adds N to the VT(S) 12v for that channel 12 to generate the respective activation time 17t. The activation times 17t are then placed in the security mode command and sent, via the signaling channel 12s, to the second station 20. Similarly, the second station 20 uses a corresponding parameter N, and VT(S) 22v for each channel 22, to generate the respective activation times 27t. The activations times 27t are then placed in the security mode complete message and sent, via channel 22s, to the first station 10. The addition of N to VT(S) 12v, 22v is a bit-wise addition with roll-over. That is, if the value of VT(S)+N exceeds the bit-size of VT(S) 12v, 22v then the activation 17t, 27t time will roll-over past zero. The activation time 17t, 27t may thus be thought of as: (VT(S)+N)mod $2^m$, where m is the bit size of VT(S) 17t, 27t, i.e., the bit size of the sequence numbers 5t, 6t.

From time to time, the first station 10 may decide to reset or re-establish a channel 12, or the second station 20 may decide to reset or re-establish a channel 22. Reset and re-establishment procedures have the same effect, as applied to the present invention, though they are of a different nature. Consequently, in the following, channel resets are considered. However, it should be understood that a channel re-establishment procedure may also be substituted in place of a channel reset procedure in any of the following. In particular, acknowledged mode channels 22 support both reset and re-establishment procedures, whereas unacknowledged mode channels 22 support only re-establishment procedures. A channel reset (or re-establishment) occurs when either the first station 10 or the second station 20 detects errors along a respective channel 12, 22, perhaps due to synchronization problems or reception problems. Resetting of a channel 12, 22 places the channel 12, 22 into a default state, and causes the corresponding channel 22, 12 to be placed into a default state as well. In particular, in response to a reset event, the state variables VT(S) 12v and 22v for corresponding channels 12 and 22 are cleared to zero. After the ciphering reconfiguration message is acknowledged, the activation times 17r, 17t, 27r, 27t for the channel 12, 22 being reset are also ignored after the reset procedure. When a channel reset occurs during a security mode reconfiguration process, the channel 12, 22 being reset immediately adopts the new ciphering configuration. For example, imagine a channel 12 having VT(S) 12v equal to 140, and an activation time 17t of 150. The next ten PDUs 17t (PDUs 17t with sequence numbers 5t from 140 to 149) should be transmitted using the old ciphering configuration, i.e., enciphered using the ciphering key 14k. PDUs 17t with sequence numbers 5t from 150 and onwards should be enciphered under the new ciphering configuration, using the new ciphering key 14n. However, if this channel 12 is reset, VT(S) 12v is set to zero, and the activation time 17t is then ignored so that the new ciphering configuration is immediately used. One way of implementing ignoring of the activation time 17t is simply to set the activation time 17t equal to the default value of VT(S) 12v. VT(S) 12v holds the sequence number 5t of the next PDU 11t that is to be transmitted, and as VT(S) 12v equals the activation time 17t, the PDU 11t that is next being transmitted must use the new ciphering configuration (i.e., the new key 14n) for ciphering, as must all sequentially later PDUs. In any event, any time a channel 12, 22 is reset after the ciphering reconfiguration message is acknowledged during a security mode reconfiguration process, the channel 12, 22 being reset must immediately apply the new ciphering configuration to all subsequently transmitted PDUs 11t, 21t.

In most situations, this immediate use of the new ciphering configuration for a channel 12, 22 that has been reset poses no problems. However, under certain conditions, problems may occur. Please refer to FIGS. 2a to 2c, with reference to FIG. 1. FIGS. 2a to 2c are message sequence charts for three different possible cases of effecting a ciphering reconfiguration process and then resetting a channel. The first case is depicted in FIG. 2a, in which everything proceeds normally and as planned. The base station 10 decides that the security interval 14x has been exceeded, and so transmits a security mode command to the mobile unit 20, in the form of one or more PDUs 11t along the channel 12s. The mobile unit 20 sends acknowledgement of the successful reception of the security mode command PDUs 11t to the base station 10. A channel 12, 22 is then reset, initiated by either the base station 10 or the mobile unit 20. According to the prior art, the new ciphering configuration should be immediately applied to the reset channel 12 by the base station 10, and to the corresponding reset channel 22 by the mobile unit 20.

Now, consider a second case as present by FIG. 2b. In FIG. 2b, the security mode command has been successfully received by the mobile unit 20, but the acknowledgment of this, sent by the mobile unit 20 to the base station 10, is lost in transmission. The mobile unit 20 has no way of knowing that acknowledgement of the security mode command has been lost in transmission, and so, from the point of view of the mobile unit 20, case 2 as presented by FIG. 2b is identical to case 1 as presented by FIG. 2a. Consequently, upon resetting a channel 12, 22, the base station 10 should immediately apply the new ciphering configuration to the reset channel 12, as this is exactly what the mobile unit will do to the corresponding reset channel 22. Ciphering synchronization is thereby maintained along the reset channel 12, 22 by the mobile unit 20 and base station 10. Behavior for resetting before acknowledgement of the ciphering reconfiguration message is not explicitly defined in the prior art. However, the above implies that the new ciphering configuration should be used.

The worst-case scenario, however, is presented as case 3 in FIG. 2c. In FIG. 2c, the security mode command is lost in transmission, and so is never received by the mobile unit 20. The mobile unit 20 thus does not send any acknowledgement of the security mode command to the base station 10. From the point of view of the base station 10, however, this case is identical to case 2 of FIG. 2b, as the base station 10 has no way of knowing that the security mode command was lost in transmission. Consequently, upon resetting a channel 12, 22, the base station 10 should immediately apply the new ciphering configuration to the reset channel 12. However, the mobile unit 20 has no way of knowing that a new ciphering configuration should be used, as the security mode command was lost in transmission. Consequently, the mobile unit 20 will continue to use the old ciphering configuration after the channel reset procedure, and hence ciphering synchronization will be lost on the reset channel.

SUMMARY OF INVENTION

It is therefore a primary objective of this invention to provide a method for ensuring synchronization between two station during ciphering reconfiguration and reset events.

Briefly summarized, the preferred embodiment of the present invention discloses a method for handling a channel reset when performing a ciphering configuration change in a wireless communications system. The wireless communications system includes a first station in wireless communications with a second station over at least a first channel and a second channel. The first station is used to transmit protocol data units (PDUs) to the second station. Each PDU has a sequence number that indicates a sequential ordering of the PDU with respect to other PDUs. The first station includes a first ciphering configuration, a second ciphering configuration, and a ciphering engine. The ciphering engine uses the first ciphering configuration or the second ciphering configuration when enciphering PDUs. A first activation time is determined for the first channel. A ciphering reconfiguration message is composed that contains the first activation time. The first station transmits the ciphering reconfiguration message to the second station along the second channel. A reset operation is performed on the first channel. The reset operation does not affect the first activation time. The first station then awaits acknowledgement of the ciphering reconfiguration message from the second station. The ciphering engine uses the first ciphering configuration to encipher all PDUs transmitted along the first channel that have sequence numbers sequentially prior to the first activation time, and uses the second ciphering configuration to encipher all PDUs transmitted along the first channel that have sequence numbers sequentially on or after the first activation time. The second channel also has an activation time, a second activation time, that is also included in the ciphering reconfiguration message. If a reset operation is performed on the second channel, the second activation time for the second channel is not affected, and the first station retransmits the ciphering reconfiguration message to the second station along the second channel after completing the reset operation if the ciphering reconfiguration message has not been acknowledged by the second station.

It is an advantage of the present invention that by not permitting a channel reset to affect the activation time for the channel being reset, ciphering synchronization is ensured for the reset channel between the first and second stations. Data loss due to lack of synchronization between the ciphering engines on the two stations is thereby reduced.

These and other objectives of the present invention will no doubt become obvious to those of ordinary skill in the art after reading the following detailed description of the preferred embodiment, which is illustrated in the various figures and drawings.

BRIEF DESCRIPTION OF DRAWINGS

FIG. 4 is a block diagram of a ciphering reconfiguration message.

FIG. 5 is a message sequence chart for a first ciphering reconfiguration and reset possibility according to the present invention.

DETAILED DESCRIPTION

In the following description, a station may be a mobile telephone, a handheld transceiver, a base station, a personal data assistant (PDA), a computer, or any other device that requires a wireless exchange of data. It should be understood that many means may be used for the physical layer to effect wireless transmissions, and that any such means may be used for the system hereinafter disclosed.

Figure 3:
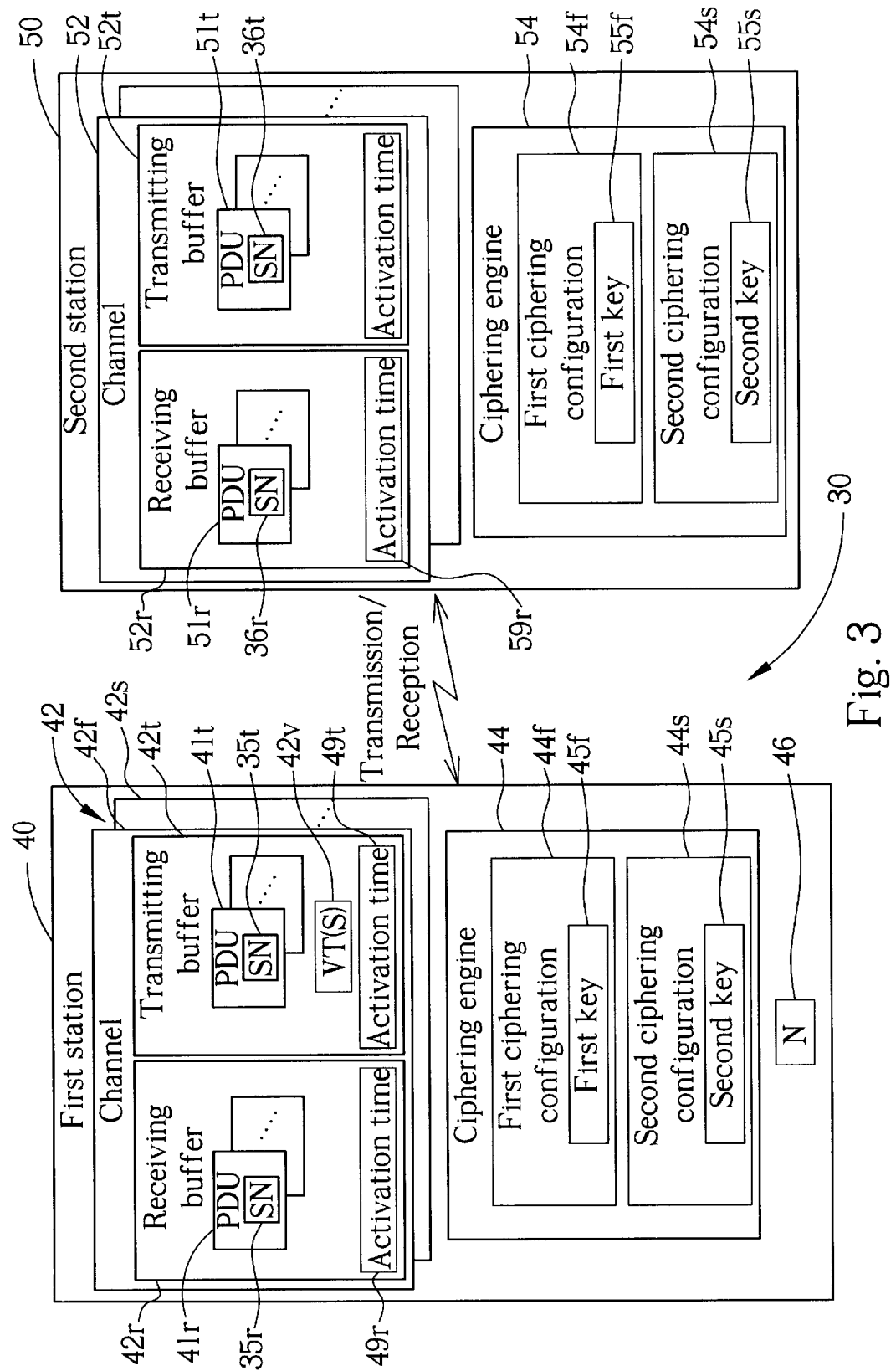
FIG. 3 is a simplified block diagram of a wireless communications system according to the present invention.

Please refer to FIG. 3. FIG. 3 is a simplified block diagram of a wireless communications system 30 according to the present invention. The wireless communications system 30 is much like that of the prior art. The wireless communications system 30 includes a first station 40 in wireless communications with a second station 50 over a plurality of established channels 42. In particular, there is a first channel 42f that is a data channel 42, and a second channel 42s that is a signaling channel 42. The second, signaling channel 42s is used to exchange protocol signaling data between the first station 40 and the second station 50, such as ciphering reconfiguration messages like the security mode command and the security mode complete messages. The first, data channel 42f is used to exchange application data between the first station 40 and the second station 50. As noted, the first station 40 establishes channels 42 to effect communications with the second station 50. The second station 50 establishes a corresponding channel 52 for each channel 42 of the first station 40. The first station 40 may also release an established channel 42, in which case the second station 50 releases the corresponding channel 52. Typically, each channel 42 has a receiving buffer 42r and a transmitting buffer 42t. Similarly, on the second station 50, each channel 52 has a receiving buffer 52r and a transmitting buffer 52t. However, in some setups a channel 42 may have only a receiving buffer 42r, or a transmitting buffer 42t, in which case the corresponding channel 52 on the second station 50 will have a single transmitting buffer 52t or receiving buffer 52r. The receiving buffer 42r is used to hold protocol data units (PDUs) 41r received from the second station 50. The transmitting buffer 42t is used to hold PDUs 41t awaiting transmission to the second station 50. A PDU 41t is transmitted along its channel 42 to the second station 50, where it is received and placed into the receiving buffer 52r of the corresponding channel 52. Similarly, a PDU 51t is transmitted along its channel 52 to the first station 40, where it is received and placed into the receiving buffer 42r of the corresponding channel 42. Each PDU 41r, 41t, 51r, 51t has an associated m-bit sequence number 35r, 35t, 36r, 36t that indicates the sequential position of the PDU 41r, 41t, 51r, 51t within its respective buffer 42r, 42t, 52r, 52t. Sequentially later PDUs 41r, 41t, 51r, 51t have sequentially higher sequence numbers 35r, 35t, 36r, 36t. The sequence number 35r, 35t, 36r, 36t is embedded within the respective PDU 41r, 41t, 51r, 51t. The bit size m of each sequence number 35r, 35t, 36r, 36t will depend upon the connection type used for corresponding channels 42 and 52. For example, the second, signaling channel 42s is generally established as an acknowledged mode channel 42, with each transmitted PDU 41t explicitly carrying a 12-bit sequence number 35t, and each successfully received PDU 41r acknowledged as received by the first station 40 to the second station 50.

The first station 40 has a ciphering engine 44 that is used to perform enciphering/deciphering of the PDUs 41t, 41r. When performing the enciphering/deciphering of the PDUs 41t, 41r, for each channel 42 the ciphering engine 44 may use a first ciphering configuration 44f, or a second ciphering configuration 44s. For a corresponding channel 52 on the second station 50, a ciphering engine 54 on the second station 50 may use a first ciphering configuration 54f, or a second ciphering configuration 54s that is identical to that of the channel 42 on the first station 40. In this manner, synchronization of the ciphering engines 44, 54 is ensured on all channels 42, 52. As an example, the first ciphering configuration 44f may indicate that ciphering is active and using a first key 45f. In this case, for a channel 42 using the first ciphering configuration 44f, all transmitted PDUs 41t are first enciphered by the ciphering engine 44 using the first key 45f. Similarly, all received PDUs 41r on the channel 42 are deciphered using the first key 45f. The second ciphering configuration 44s may indicate that ciphering is active, using a second key 45s. The ciphering engine 54 of the second station 50 thus uses a first key 55f, identical to the first key 45f, for the first ciphering configuration 54f, and a second key 55s identical to the second key 45s for the second ciphering configuration 54s. Note that, alternatively, any one of the ciphering configurations 44f, 44s may indicate that ciphering is inactive. In general, a ciphering configuration 44f, 44s, 45f, 45s simply indicates how ciphering is to be applied to the PDUs 41r, 41t, 51r, 51t, and a ciphering configuration 44f, 44s on the first station 40 should be identical to a corresponding ciphering configuration 54f, 54s on the second station 50.

Please refer to FIG. 4 with reference to FIG. 3. FIG. 4 is a block diagram of a ciphering reconfiguration message 60. The present invention shall be explained with respect to the first station 40. The first station 40 may be either a base station or a mobile unit. To perform a ciphering configuration change, that is, a security mode reconfiguration process, the first station 40 must transmit the ciphering reconfiguration message 60 to the second station 50 along the second, signaling channel 42s. If the first station 40 is a base station, then the ciphering reconfiguration message 60 would be a security mode command message, whereas if the first station 40 is a mobile unit then the ciphering reconfiguration message 60 would be a security mode complete message, as described in the Background of the Prior Art. The ciphering reconfiguration message includes a ciphering configuration 62 and a plurality of activation times 64. Each of the activation times 64 is for a corresponding activation time 49t of the transmitting buffer 42t of a channel 42. All transmission activation times 49t should be represented in the ciphering configuration message 60, though this is not absolutely required. The ciphering configuration field 62 indicates which ciphering configuration is to be adopted, i.e., the first ciphering configuration 44f or the second ciphering configuration 44s. In the following, it is assumed that the first and second stations 40, 50 are both initially using the first ciphering configuration 44f, 54f for all channels 42, 52. The security mode reconfiguration process is being used to change over to the second ciphering configuration 44s, 54s. Hence, the ciphering configuration 62 in the ciphering reconfiguration message will indicate the second ciphering configuration 44s.

Initially, the first station 40 determines that a ciphering reconfiguration change is required for the channels 42, either in response to a security mode command from the second station 50 (if the first station 40 is a mobile unit), or after determining that the first ciphering configuration 44f has been used for too long (if the first station 40 is a base station). In either event, the first station 40 must determine a transmission activation time 49t for each channel 42, and place these activation times 49t into the ciphering reconfiguration message 60 as the activation times 64. In particular, then, held within the ciphering reconfiguration message 60 there will be a first activation time 64f for the first, data channel 42f, and a second activation time 64s for the second, signaling channel 42s. To generate the activation times 49t and 64, the first station 40 first determines a parameter N 46 according to how many PDUs 41t are required to transmit the complete ciphering reconfiguration message 60 to the second station 50. The parameter N 46 should be greater than the number of PDUs 41t required to transmit the ciphering reconfiguration message 60 so as to ensure that the ciphering reconfiguration message 60 may be fully transmitted along the second channel 60 without running past the activation time 49t, 64s for the second channel 42s. For example, if 5 PDUs 41t are required to transmit the ciphering reconfiguration message 60, then the parameter N 46 may be set to 15 to provide ample leeway for the transmission of the ciphering reconfiguration message 60 along the second channel 42s, and to provide the first channel 42f enough time, in terms of PDUs 41t, to continue transmitting without interruption while awaiting completion of the ciphering reconfiguration process. As noted previously, each transmitting buffer 42t includes a state variable VT(S) 42v that indicates the sequence number 35t of a PDU 41t that is next to be transmitted along the channel 42. VT(S) 42v will be m bits in size, corresponding to the bit size of the sequence number 35t of the PDU 41t. The bit size m is determined by the transmission mode for the channel 42. As an example, for an acknowledged mode channel 42, such as the second channel 42s, m has a value of 12. Whereas, in an unacknowledged mode channel (perhaps the first, data channel 42f), m may have a value of 7. The activation time for a channel 42 is then given by equation (1) below:

$$MAX((VT(S)+N) \bmod 2^m, N) \quad (1)$$

The function MAX(a, b) returns the larger of a or b, and "mod" is the modulus operator, returning the remainder of a division operation. For example, imagine that the sequence numbers 35t for PDUs 41t transmitted along the first channel 42f are 7 bits in size, and that VT(S) 42v for the first channel 42f has a value of 22, at the time of deciding the activation time 49t, 64f. If N 46 is 15, then the activation time 49t, 64f for the first channel 42f would be:

$$MAX((22+15) \bmod 2^7, 15) = MAX(37, 15) = 37$$

On the other hand, suppose that VT(S) 42v for the second, signaling channel 42s holds a value of 4084, a 12-bit number, at the time of computing the activation time 49t, 64s. The activation time 49t, 64s for the second channel would be:

$$MAX((4084+15) \bmod 2^{12}, 15) = MAX(3, 5) = 15$$

After determining the activation times 49t for all channels 42, and composing the ciphering reconfiguration message 60, the first station 40 then suspends all channels 42, with the possible exception of the second, signaling channel 42s that is to carry the ciphering reconfiguration message 60. Determining whether or not the second channel 42s, or any channel 42, should be suspended is a design choice that does not directly affect the present invention. In the preferred embodiment, it is envisioned that the second channel 42s is not suspended, though all other channels 42, both signaling and data, are suspended. When a channel 42 is suspended, the channel 42 may not transmit any PDU 41t having a sequence number 35t that is sequentially on or after the activation time 49t for that channel 42. Any PDU 41t that is sequentially before the activation time 49t may be transmitted, using the prior ciphering configuration, i.e., the first ciphering configuration 44f. In keeping with the above example, after suspending the first channel 42f, the first channel 42f may transmit 15 more PDUs 41t, with sequence numbers 35t from VT(S) 42v, a value of 22, up to (but not including) the activation time 49t, 64f, a value of 37.

After suspending all appropriate channels 42, the first station 40 transmits the ciphering reconfiguration message 60 to the second station 50 along the second, signaling channel 42s. Since the second channel 42s is an acknowledged mode channel 42, the first station 40 should receive acknowledgement of the successful reception of the ciphering reconfiguration message 60 from the second station 50. Until then, all suspended channels 42 remain suspended. A channel reset may occur to a channel 42 either before or after acknowledgment is received by the first station 40, and which may or may not include the signaling channel 42s. Channel resets generally occur when protocol errors are detected on a channel 42, and result in handshaking between the first and second stations 40, 50 to place the corresponding channel 42, 52 into a default state. This generally involves the placing of default values into all channel 42 state variables, such as VT(S) 42v, and the clearing of buffers 42r and 42t. The reset procedure does not, however, change the activation times 49t, 49r. Nor are the activation times 49t, 49r ignored after a reset procedure. Hence, the reset procedure for a channel 42 does not affect the corresponding activation time 49t for the channel 42 being reset. In the following, the first channel 42f is used to represent any channel 42 that is not the second channel 42s that carries the ciphering reconfiguration message 60. Four possibilities arise:

1) The first channel 42f is reset prior to acknowledgment from the second station 50 of the ciphering reconfiguration message 60.

2) The first channel 42f is reset after acknowledgement from the second station 50 of the ciphering reconfiguration message 60.

3) The second channel 42s is reset prior to acknowledgment from the second station 50 of the ciphering reconfiguration message 60. Or, 4) The second channel 42s is reset after acknowledgment from the second station 50 of the ciphering reconfiguration message 60.

In all of the above cases, the reset procedure does not affect the activation time 49t of the channel 42 being reset. That is, the activation time 49t before the reset procedure will be identical to the activation time 49t after the reset procedure for the channel 42 being reset. Furthermore, the present invention only considers those situations in which the reset procedure is completed before the activation time 49t for the channel 42 being reset has been reached or passed. If the reset procedure for a channel 42 is completed after the channel 42 has reached or exceeded the activation time 49t for that channel 42, the ciphering reconfiguration procedure is considered finished and immediate use of the second (i.e., new) ciphering configuration 44s is appropriate. In the following, when saying that a channel 42 has been reset, it is meant that the reset procedure has caused the state variables for the channel 42 (such as VT(S) 42v) to be placed into default conditions. This reset procedure takes a certain amount of time, and it is the time of completion for resetting the state of all state variables associated with the channel 42 of the reset procedure that is considered in the following.

Please refer to FIG. 5. FIG. 5 is a message sequence chart for case (1) above. The first station 40 determines that a ciphering configuration change is to be performed, determines the activation time 49t, 64f for the first channel 42f (and all other channels 42) according to equation (1) above, composes the ciphering reconfiguration message 60, suspends the first channel 42f (and all other appropriate channels 42), and then transmits the ciphering reconfiguration message 60 along the second channel 42s to the second station 60. As noted before, suspending of the first channel 42f is not required for the proper functioning of the present invention method, but is simply preferred. Prior to receiving acknowledgment of the ciphering reconfiguration message 60, the first channel 42f is reset. That is, the reset procedure for the first channel 42 is completed before acknowledgment of the ciphering reconfiguration message 60 is received from the second station 50. The activation time 49t, 64f for the first channel 42f is unaffected by the reset procedure, though VT(S) 42v for the first channel 42f is set to a default value of zero. The first channel 42f remains suspended (if such channel suspending is utilized), using the previously determined activation time 49t, 64f. In the example above, the activation time 49t, 64f for the first channel 42f would remain 37 after the reset procedure, so that the first channel 42f is free to transmit any PDUs 41t with sequence numbers 35t from zero to 36, using only the first ciphering configuration 44f. After receiving acknowledgement from the second station 50 of the ciphering reconfiguration message 60, the first station 40 then resumes the first channel 42f (and all other suspended channels 42). Once resumed, a channel 42 is free to transmit PDUs 41t with sequence numbers 35t before, on and after the activation time 49t for the channel 42. The first ciphering configuration 44f is used for PDUs 41t with sequence numbers 35t before the activation time 49t, and the second ciphering configuration 44s is used for PDUs 41t with sequence numbers 35t on or after the activation time 49t.

Figure 6:
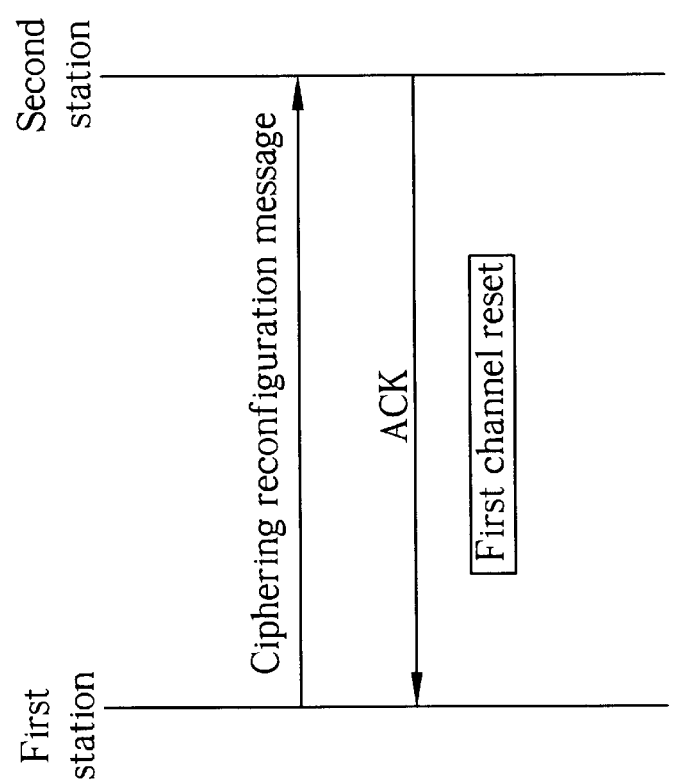
FIG. 6 is a message sequence chart for a second ciphering reconfiguration and reset possibility according to the present invention.

Please refer to FIG. 6. FIG. 6 is a message sequence chart for case (2) above. Case (2) is nearly identical to case (1), except that acknowledgment of the ciphering reconfiguration message 60 is received prior to the first channel 42f being reset. The first channel 42f is thus resumed prior to being reset. Nevertheless, after being reset, and the state variable VT(S) 42v being set to zero, the activation time 49t, 64f will remain the same. If the reset procedure occurs before the first channel 42f reaches the activation time 49t, 64f (which is the field of consideration of the present invention), the first station 40 will use the first ciphering configuration 44f for PDUs 41t with sequence numbers 35t from zero up to the activation time 49t, 64f (i.e., in the above example, up to and including 36), and then use the second ciphering configuration 44s for PDUs 41t with sequence numbers 35t sequentially on or after the activation time 49t, 64f (i.e., on or after 37). On the other hand, if the reset procedure occurs after the first channel 42f has reached (or passed) the activation time 49t, 64f, then the ciphering configuration process for the first channel 42f is completed before the reset procedure, and the first channel 42f has completely adopted the second ciphering configuration 44s. In this case, after the reset procedure, the first channel 42f continues to use the second ciphering configurations 44s.

Figure 7:
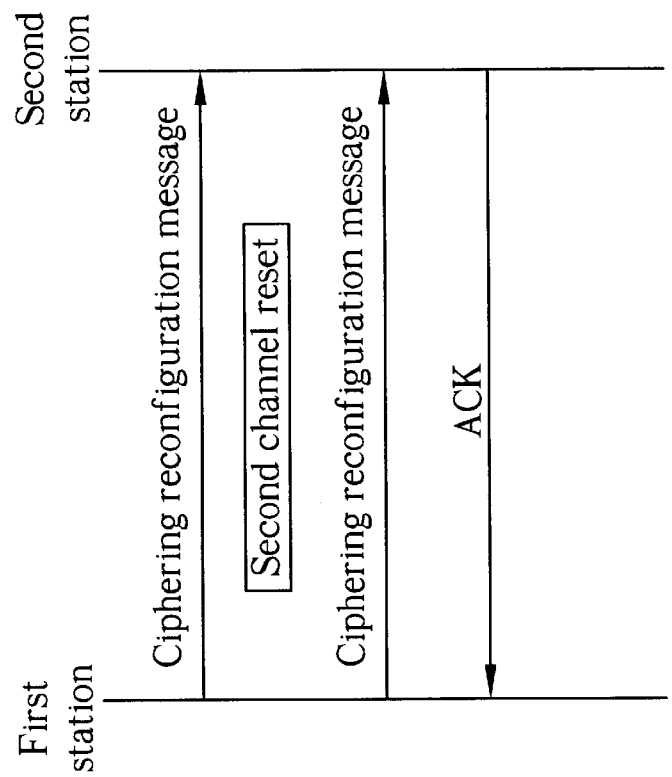
FIG. 7 is a message sequence chart for a third ciphering reconfiguration and reset possibility according to the present invention.

Please refer to FIG. 7. FIG. 7 is a message sequence chart for case (3) above. Resetting of the second, signaling channel 42s, which carries the ciphering reconfiguration message 60, is a bit more complicated. After transmitting the ciphering reconfiguration message 60, and prior to acknowledgement of the ciphering reconfiguration message 60 from the second station 50, the second channel 42s is reset. The activation time 49t, 64s for the second channel 42s is not affected by the reset procedure. In the above example, before the reset procedure, the activation time 49t, 64s for the second channel 42s was 15. Hence, after the reset procedure, the activation time 49t, 64s for the second channel 42s will remain 15. To ensure that the ciphering reconfiguration message 60 is properly sent to the second station 50, the first station 40 re-transmits the ciphering reconfiguration message 60 along the second channel 42s. To account for this, it is thus imperative that the parameter N 46 be large enough to accommodate any required subsequent re-transmitting of the ciphering reconfiguration message 60. In the above example, N 46 is set to 15 for a ciphering reconfiguration message 60 requiring 5 PDUs 41t to be transmitted. This allows plenty of room, in terms of PDUs 41t, for re-transmissions of the ciphering reconfiguration message 60 along the second channel 42s. The use of the MAX( ) function of equation (1) should now be clear. If equation (1) were simply:

$$(VT(S)+N) \bmod 2^m,$$

as is given in the prior art, then the activation time 49t, 64s for the second channel 42s may not be sufficiently large to ensure that the re-transmitted ciphering reconfiguration message 60 lies fully within the range of the first ciphering configuration 44f. This is because, upon reset, VT(S) 42v for the second channel 42s is set to zero. In the above example, the activation time 49t, 64s has a value of 15, whereas according to the prior art, the activation time 49t, 64s would only be 3. After resetting the second channel 42s, an activation time 49t, 64s of 3 would not permit all five of the PDUs 41t that make up the ciphering reconfiguration message 60 to be transmitted using only the first ciphering configuration 44f. Using the maximum value of N and ((VT(S)+N)mod $2^m$) as the activation time 49t, 64s ensures that a sufficiently long activation time 49t, in terms of transmitted PDUs 41t, is available to re-transmit the ciphering reconfiguration message 60 for the present invention. After receiving acknowledgment of the ciphering reconfiguration message 60, all suspended channels 42 are resumed.

Figure 8:
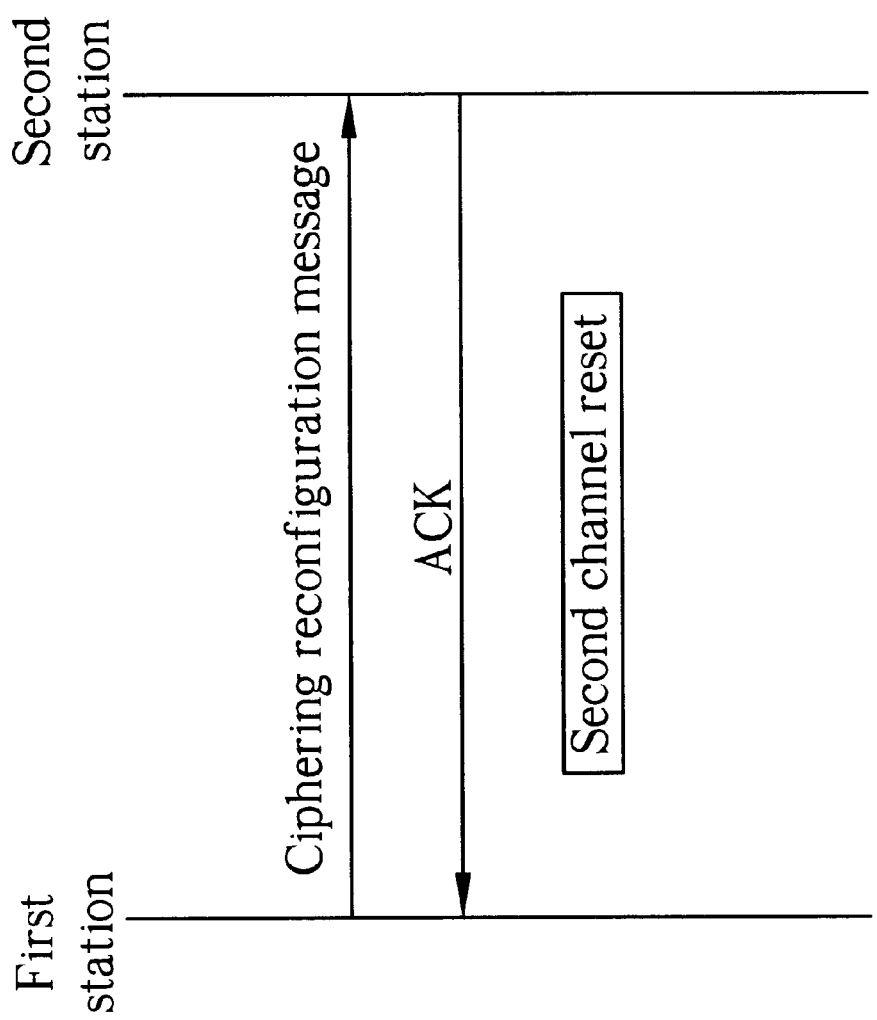
FIG. 8 is a message sequence chart for a fourth ciphering reconfiguration and reset possibility according to the present invention.

Please refer to FIG. 8. FIG. 8 is a message sequence chart for case (4) above. In case (4), the second channel 42s is reset after acknowledgement of the ciphering reconfiguration message 60 and prior to reaching the activation time 49t, 64s for the second channel 42s. All suspended channels 42 are resumed after receiving the acknowledgement signal from the second station 50. The activation time 49t, 64s for the second channel 42s is not affected by the reset procedure, though the state variable VT(S) 42v is set to zero. Since the ciphering reconfiguration message 60 was already confirmed as received by the second station 50, there is no need to re-transmit the ciphering reconfiguration message 60.

Figure 1:
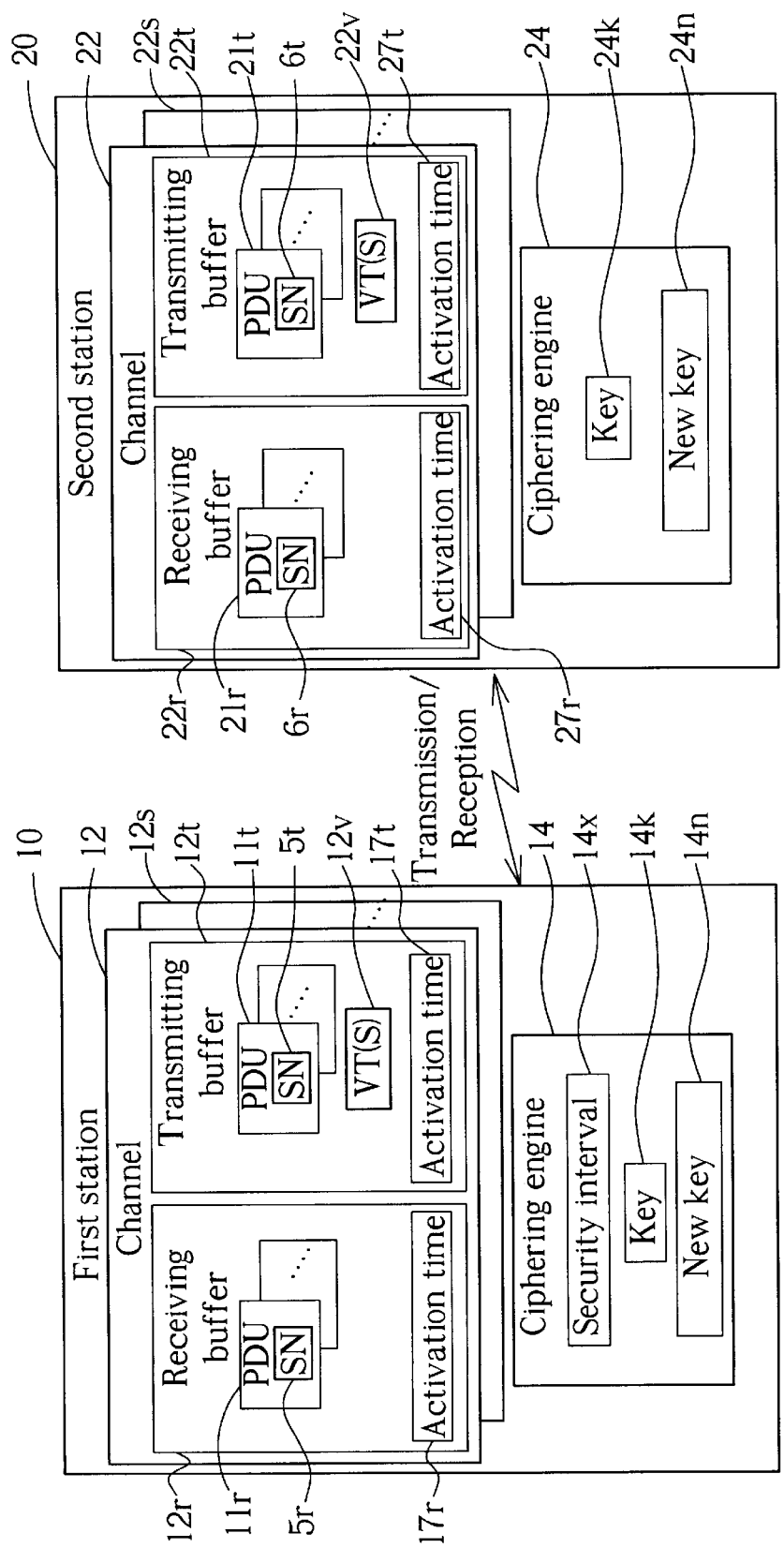
FIG. 1 is a simplified block diagram of a prior art wireless communications system.
Figures 2A, 2B, 2C:
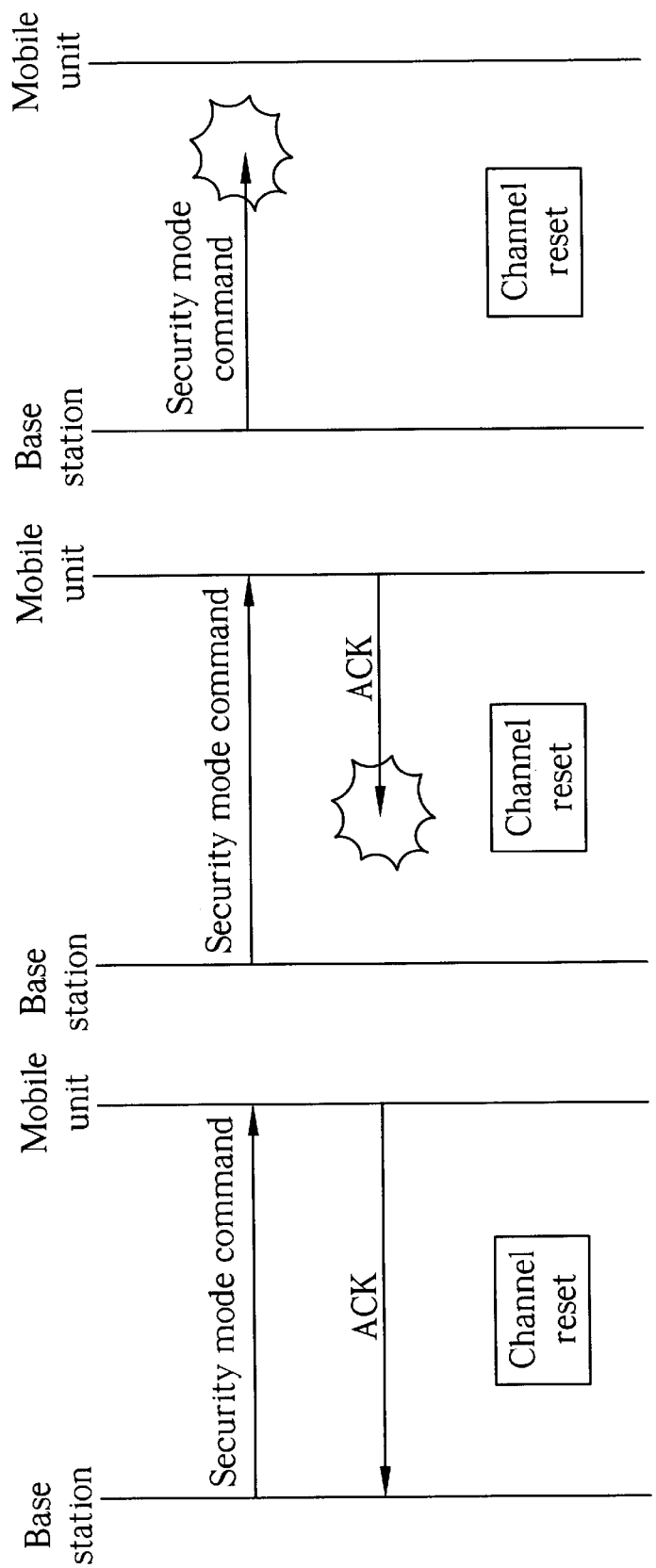
FIGS. 2a to 2c are message sequence charts for three different possible cases of effecting a ciphering reconfiguration process and then resetting a channel according to the prior art.
Figures 9A, 9B, 9C:
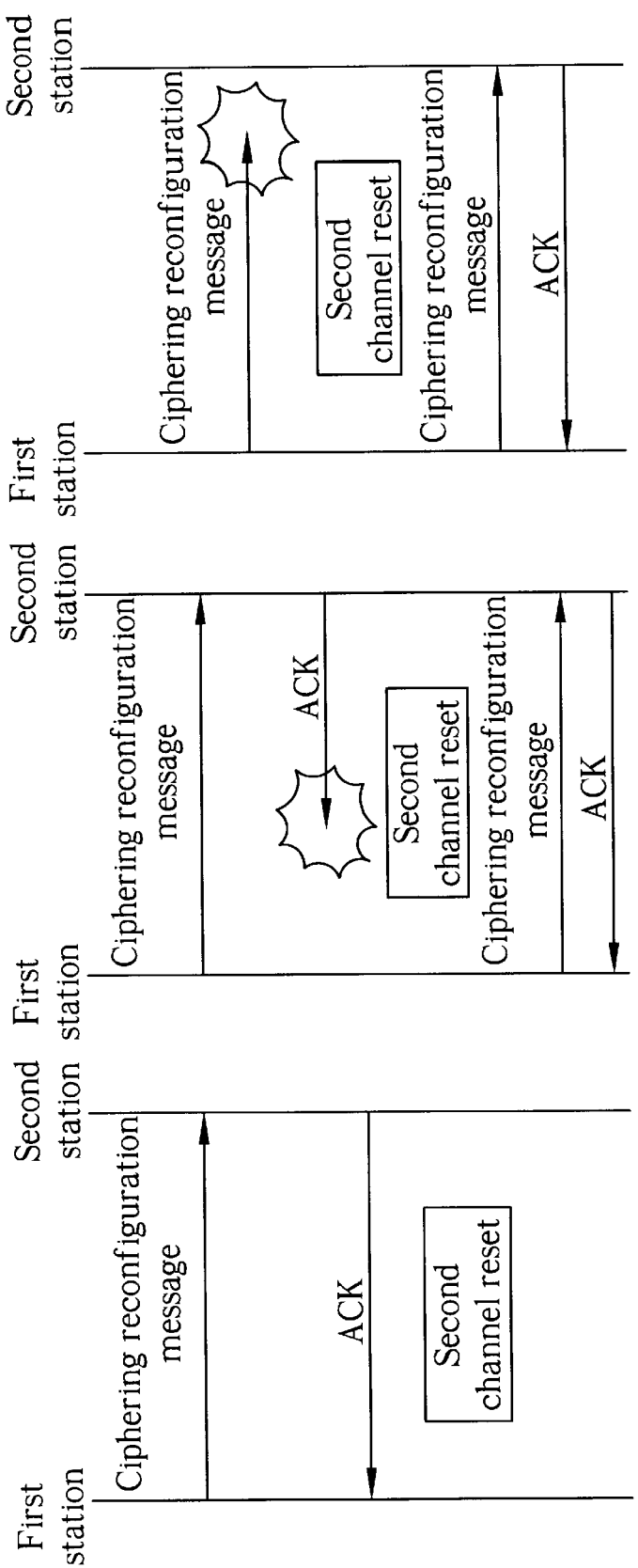
FIGS. 9a to 9c are message sequence charts for three different possible cases of effecting a ciphering reconfiguration process and then resetting a channel according to the present invention.

Please refer to FIGS. 9a to 9c. FIGS. 9a to 9c are message sequence charts of effecting a ciphering reconfiguration process and then resetting a channel according to the present invention. FIGS. 9a to 9c illustrate the examples presented in FIGS. 2a to 2c, previously discussed. In FIGS. 9a to 9c, resetting of the second channel 42s is considered. In the first situation as presented in FIG. 9a, the ciphering reconfiguration message 60 is successfully transmitted and acknowledged. The activation time 49t, 64s of the second channel 42s will thus have a corresponding activation time 59r on the second station 50. After resetting the second channel 42s, the activation times 49t, 59r are unaffected, and so ciphering synchronization between the first station 40 and second station 50 is assured. This corresponds to case (4) above. In the second situation as presented in FIG. 9b, acknowledgement of the ciphering reconfiguration message 60 from the second station 50 is lost. From the point of view of the first station 40, this corresponds to case (3) above. After the resetting of the second channel 42s, the first station 40 continues to use the first ciphering configuration 44f when re-transmitting the ciphering reconfiguration message 60. As the second station 50 behaves in a manner corresponding to the first station 40, the second station 50 also uses the first ciphering configuration 54f when receiving the ciphering reconfiguration message 60, and so synchronization is ensured between the ciphering engines 44 and 54. In the third situation, as presented by FIG. 9c, the ciphering reconfiguration message 60 is lost in transmission from the first station 40. A channel reset for the second channel 42s is then performed, which, from the point of view of the first station 40, corresponds to case (3) above. Because the activation time 49t, 64s for the second channel 42s is not affected by the reset procedure, the first station 40 uses the first ciphering configuration 44f when re-transmitting the ciphering reconfiguration message 60. Of course, the second station 50 is also using the first ciphering configuration 54f, as the second station 50 never initially received the ciphering reconfiguration message 60. Consequently, ciphering synchronization is ensured between the first station 40 and the second station 50.

In contrast to the prior art, the present invention provides for a reset procedure during a ciphering configuration change that does not affect the activation times of the channel being reset. Further, the present invention provides a new method for determining activation times to ensure that re-transmitted ciphering configuration messages are properly synchronized with a second station.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for handling a channel reset when performing a ciphering configuration change in a wireless communications system, the wireless communications system comprising a first station in wireless communications with a second station over at least a first channel and a second channel, the first station capable of transmitting protocol data units (PDUs) to the second station, each PDU comprising an associated sequence number that indicates a sequential ordering of the PDU with respect to other PDUs, the first station comprising:

a first ciphering configuration;
a second ciphering configuration; and
a ciphering engine, wherein the ciphering engine uses the first ciphering configuration or the second ciphering configuration when enciphering PDUs;

the method comprising:

determining a first activation time for the first channel;
composing a ciphering reconfiguration message that contains the first activation time;
the first station transmitting the ciphering reconfiguration message to the second station along the second channel;
prior to the first station receiving acknowledgment of the ciphering reconfiguration message from the second station and prior to the first channel reaching the first activation time, performing a reset operation on the first channel; wherein the reset operation does not affect the first activation time; and
the first station awaiting acknowledgement of the ciphering reconfiguration message from the second station;
wherein after the reset operation, the ciphering engine uses the first ciphering configuration to encipher all PDUs transmitted along the first channel that have sequence numbers sequentially prior to the first activation time, and uses the second ciphering configuration to encipher all PDUs transmitted along the first channel that have sequence numbers sequentially on or after the first activation time.

2. The method of claim 1 wherein the first station further comprises a first state variable that indicates an m-bit sequence number of a PDU that is next to be transmitted along the first channel, and determining the first activation time comprises:

determining a first parameter N, the first parameter N corresponding to the number of PDUs to transmit along the first channel before utilizing the second ciphering configuration;
obtaining a first transitory value by applying the modulus of $2^m$ to a sum of the first parameter N and the first state variable; and
selecting the larger of the first transitory value or the first parameter N as the first activation time.

3. The method of claim 1 further comprising determining a second activation time for the second channel, and the ciphering reconfiguration message further contains the second activation time; wherein after the reset operation, the ciphering engine uses the first ciphering configuration to encipher all PDUs transmitted along the second channel that have sequence numbers sequentially prior to the second activation time, and uses the second ciphering configuration to encipher all PDUs transmitted along the second channel that have sequence numbers sequentially on or after the second activation time.

4. The method of claim 3 wherein the first station further comprises a second state variable that indicates an m-bit sequence number of a PDU that is next to be transmitted along the second channel, and determining the second activation time comprises:

determining a second parameter N, the second parameter N corresponding to the number of PDUs to transmit along the second channel before utilizing the second ciphering configuration;
obtaining a second transitory value by applying the modulus of $2^m$ to a sum of the second parameter N and the second state variable; and selecting the larger of the second transitory value or the second parameter N as the second activation time;

wherein N is at least as great as a number of PDUs required to transmit the ciphering reconfiguration message to the second station.

5. The method of claim 1 further comprising:

after determining the first activation time, the first station suspending the first channel; wherein while the first channel is suspended by the first station, the first station will not transmit any PDU along the first channel having a sequence number that is sequentially on or after the first activation time; and after receiving acknowledgement of the ciphering reconfiguration message from the second station, the first station resuming the first channel; wherein the first station transmits PDUs along the first channel having sequence numbers that are sequentially on or after the first activation time after the first channel is resumed.

6. A method for handling a channel reset when performing a ciphering configuration change in a wireless communications system, the wireless communications system comprising a first station in wireless communications with a second station over at least a first channel and a second channel, the first station capable of transmitting protocol data units (PDUs) to the second station, each PDU comprising an associated sequence number that indicates a sequential ordering of the PDU with respect to other PDUs, the first station comprising:

a first ciphering configuration;

a second ciphering configuration; and a ciphering engine, wherein the ciphering engine uses the first ciphering configuration or the second ciphering configuration when enciphering PDUs;

the method comprising:

determining a first activation time for the first channel;

composing a ciphering reconfiguration message that contains the first activation time;

the first station transmitting the ciphering reconfiguration message to the second station along the second channel; and after receiving acknowledgment of the ciphering reconfiguration message from the second station and prior to the first channel reaching the first activation time, performing a reset operation on the first channel; wherein the reset operation does not affect the first activation time;

wherein after the reset operation, the ciphering engine uses the first ciphering configuration to encipher all PDUs transmitted along the first channel that have sequence numbers sequentially prior to the first activation time, and uses the second ciphering configuration to encipher all PDUs transmitted along the first channel that have sequence numbers sequentially on or after the first activation time.

7. The method of claim 6 wherein the first station further comprises a first state variable that indicates an m-bit sequence number of a PDU that is next to be transmitted along the first channel, and determining the first activation time comprises:

determining a first parameter N, the first parameter N corresponding to the number of PDUs to transmit along the first channel before utilizing the second ciphering configuration;

obtaining a first transitory value by applying the modulus of $2^m$ to a sum of the first parameter N and the first state variable; and selecting the larger of the first transitory value or the first parameter N as the first activation time.

8. The method of claim 6 further comprising determining a second activation time for the second channel, and the ciphering reconfiguration message further contains the second activation time; wherein after the reset operation, the ciphering engine uses the first ciphering configuration to encipher all PDUs transmitted along the second channel that have sequence numbers sequentially prior to the second activation time, and uses the second ciphering configuration to encipher all PDUs transmitted along the second channel that have sequence numbers sequentially on or after the second activation time.

9. The method of claim 8 wherein the first station further comprises a second state variable that indicates an m-bit sequence number of a PDU that is next to be transmitted along the second channel, and determining the second activation time comprises:

determining a second parameter N, the second parameter N corresponding to the number of PDUs to transmit along the second channel before utilizing the second ciphering configuration;

obtaining a second transitory value by applying the modulus of $2^m$ to a sum of the second parameter N and the second state variable; and selecting the larger of the second transitory value or the second parameter N as the second activation time;

wherein N is at least as great as a number of PDUs required to transmit the ciphering reconfiguration message to the second station.

10. The method of claim 6 further comprising:

after determining the first activation time, the first station suspending the first channel; wherein while the first channel is suspended by the first station, the first station will not transmit any PDU along the first channel having a sequence number that is sequentially on or after the first activation time; and after receiving acknowledgement of the ciphering reconfiguration message from the second station, the first station resuming the first channel; wherein the first station transmits PDUs along the first channel having sequence numbers that are sequentially on or after the first activation time after the first channel is resumed.

11. A method for handling a channel reset when performing a ciphering configuration change in a wireless communications system, the wireless communications system comprising a first station in wireless communications with a second station over at least a first channel and a second channel, the first station capable of transmitting protocol data units (PDUs) to the second station, each PDU comprising an associated sequence number that indicates a sequential ordering of the PDU with respect to other PDUs, the first station comprising:

a first ciphering configuration;

a second ciphering configuration; and a ciphering engine, wherein the ciphering engine uses the first ciphering configuration or the second ciphering configuration when enciphering PDUs;

the method comprising:

determining a first activation time for the first channel;

determining a second activation time for the second channel;

composing a ciphering reconfiguration message that contains the first activation time and the second activation time;

the first station transmitting the ciphering reconfiguration message to the second station along the second channel;

prior to the first station receiving acknowledgment of the ciphering reconfiguration message from the second station and prior to the second channel reaching the second activation time, performing a reset operation on the second channel; wherein the reset operation on the second channel does not affect the second activation time;

after the reset operation on the second channel, the first station re-transmitting the ciphering reconfiguration message to the second station along the second channel; and after re-transmitting the ciphering reconfiguration message, the first station awaiting acknowledgement of the ciphering reconfiguration message from the second station;

wherein after the reset operation, the ciphering engine uses the first ciphering configuration to encipher all PDUs transmitted along the first channel that have sequence numbers sequentially prior to the first activation time, uses the second ciphering configuration to encipher all PDUs transmitted along the first channel that have sequence numbers sequentially on or after the first activation time, uses the first ciphering configuration to encipher all PDUs transmitted along the second channel that have sequence numbers sequentially prior to the second activation time, and uses the second ciphering configuration to encipher all PDUs transmitted along the second channel that have sequence numbers sequentially on or after the second activation time.

12. The method of claim 11 wherein the first station further comprises a first state variable that indicates an m-bit sequence number of a PDU that is next to be transmitted along the first channel, and determining the first activation time comprises:

determining a first parameter N, the first parameter N corresponding to the number of PDUs to transmit along the first channel before utilizing the second ciphering configuration;

obtaining a first transitory value by applying the modulus of $2^m$ to a sum of the first parameter N and the first state variable; and selecting the larger of the first transitory value or the first parameter N as the first activation time.

13. The method of claim 11 wherein the first station further comprises a second state variable that indicates an m-bit sequence number of a PDU that is next to be transmitted along the second channel, and determining the second activation time comprises:

determining a second parameter N, the second parameter N corresponding to the number of PDUs to transmit along the second channel before utilizing the second ciphering configuration;

obtaining a second transitory value by applying the modulus of $2^m$ to a sum of the second parameter N and the second state variable; and selecting the larger of the second transitory value or the second parameter N as the second activation time;

wherein N is at least as great as a number of PDUs required to transmit the ciphering reconfiguration message to the second station.

14. The method of claim 11 further comprising:

after determining the first activation time, the first station suspending the first channel; wherein while the first channel is suspended by the first station, the first station will not transmit any PDU along the first channel having a sequence number that is sequentially on or after the first activation time; and after receiving acknowledgement of the ciphering reconfiguration message from the second station, the first station resuming the first channel; wherein the first station transmits PDUs along the first channel having sequence numbers that are sequentially on or after the first activation time after the first channel is resumed.

15. A method for handling a channel reset when performing a ciphering configuration change in a wireless communications system, the wireless communications system comprising a first station in wireless communications with a second station over at least a first channel and a second channel, the first station capable of transmitting protocol data units (PDUs) to the second station, each PDU comprising an associated sequence number that indicates a sequential ordering of the PDU with respect to other PDUs, the first station comprising:

a first ciphering configuration;

a second ciphering configuration; and a ciphering engine, wherein the ciphering engine uses the first ciphering configuration or the second ciphering configuration when enciphering PDUs;

the method comprising:

determining a first activation time for the first channel;

determining a second activation time for the second channel;

composing a ciphering reconfiguration message that contains the first activation time and the second activation time;

the first station transmitting the ciphering reconfiguration message to the second station along the second channel; and after receiving acknowledgment of the ciphering reconfiguration message from the second station and prior to the second channel reaching the second activation time, performing a reset operation on the second channel; wherein the reset operation on the second channel does not affect the second activation time;

wherein after the reset operation, the ciphering engine uses the first ciphering configuration to encipher all PDUs transmitted along the first channel that have sequence numbers sequentially prior to the first activation time, uses the second ciphering configuration to encipher all PDUs transmitted along the first channel that have sequence numbers sequentially on or after the first activation time, uses the first ciphering configuration to encipher all PDUs transmitted along the second channel that have sequence numbers sequentially prior to the second activation time, and uses the second ciphering configuration to encipher all PDUs transmitted along the second channel that have sequence numbers sequentially on or after the second activation time.

16. The method of claim 15 wherein the first station further comprises a first state variable that indicates an m-bit sequence number of a PDU that is next to be transmitted along the first channel, and determining the first activation time comprises:

determining a first parameter N, the first parameter N corresponding to the number of PDUs to transmit along the first channel before utilizing the second ciphering configuration;

obtaining a first transitory value by applying the modulus of $2^m$ to a sum of the first parameter N and the first state variable; and selecting the larger of the first transitory value or the first parameter N as the first activation time.

17. The method of claim 15 wherein the first station further comprises a second state variable that indicates an m-bit sequence number of a PDU that is next to be transmitted along the second channel, and determining the second activation time comprises:

determining a second parameter N, the second parameter N corresponding to the number of PDUs to transmit along the second channel before utilizing the second ciphering configuration;

obtaining a second transitory value by applying the modulus of $2^m$ to a sum of the second parameter N and the second state variable; and selecting the larger of the second transitory value or the second parameter N as the second activation time; wherein N is at least as great as a number of PDUs required to transmit the ciphering reconfiguration message to the second station.

18. The method of claim 15 further comprising:

after determining the first activation time, the first station suspending the first channel; wherein while the first channel is suspended by the first station, the first station will not transmit any PDU along the first channel having a sequence number that is sequentially on or after the first activation time; and after receiving acknowledgement of the ciphering reconfiguration message from the second station, the first station resuming the first channel; wherein the first station transmits PDUs along the first channel having sequence numbers that are sequentially on or after the first activation time after the first channel is resumed.

* * * * *